United States Patent [19]

Veenhof

[11] Patent Number: 5,016,747
[45] Date of Patent: May 21, 1991

[54] BARRIER SEAL FOR CONVEYOR SKIRTBOARD

[75] Inventor: Willem D. Veenhof, El Cajon, Calif.

[73] Assignee: Martin Engineering Company, Neponset, Ill.

[21] Appl. No.: 541,628

[22] Filed: Jun. 21, 1990

Related U.S. Application Data

[63] Continuation-in-part of Ser. No. 226,858, Aug. 1, 1988, abandoned, which is a continuation-in-part of Ser. No. 71,381, Jul. 9, 1987, abandoned.

[51] Int. Cl.$^5$ .............................................. B65G 47/44
[52] U.S. Cl. ............................ 198/525; 198/836.1; 198/836.3; 198/860.3
[58] Field of Search ............ 198/525, 547, 550.13, 198/836.1, 836.3, 836.4, 860.3

[56] References Cited

U.S. PATENT DOCUMENTS

| | | | |
|---|---|---|---|
| 2,584,288 | 2/1952 | Przyrylski | 198/836.3 X |
| 2,593,610 | 4/1952 | Roberts | 198/836.1 X |
| 2,665,795 | 1/1954 | Holwick | 198/836.1 |
| 2,883,035 | 4/1959 | Erisman | 198/547 X |
| 2,988,202 | 6/1961 | Pampel et al. | 198/836.3 X |
| 3,024,893 | 3/1962 | Lambert | 198/836.1 |
| 3,253,305 | 5/1966 | Granath | 198/525 X |
| 3,399,466 | 9/1968 | Hartley | 198/550.13 X |
| 3,499,523 | 3/1970 | Clegg | 198/836.1 |
| 3,707,222 | 12/1972 | Hartley | 198/547 X |
| 4,204,595 | 5/1980 | Marrs | 198/836.1 |
| 4,231,471 | 11/1980 | Gordon | 198/836.1 |
| 4,236,628 | 12/1980 | Stahura | 198/525 |
| 4,641,745 | 2/1987 | Skates | 198/860.3 X |
| 4,667,810 | 5/1987 | Cowpertwait et al. | 198/836.1 X |

Primary Examiner—D. Glenn Dayoan
Attorney, Agent, or Firm—Dennis T. Griggs

[57] ABSTRACT

In a conveyor belt assembly for conveying particulate material, a rigid primary seal is mounted between the inboard loading zone and an outboard region of the belt which is desired to remain clear of particulate material. A flexible secondary seal is mounted between the primary seal and the outboard region, and includes a flexible sheetlike member having a sealing portion resting with light sealing pressure in sliding contact with the upper belt surface.

25 Claims, 4 Drawing Sheets

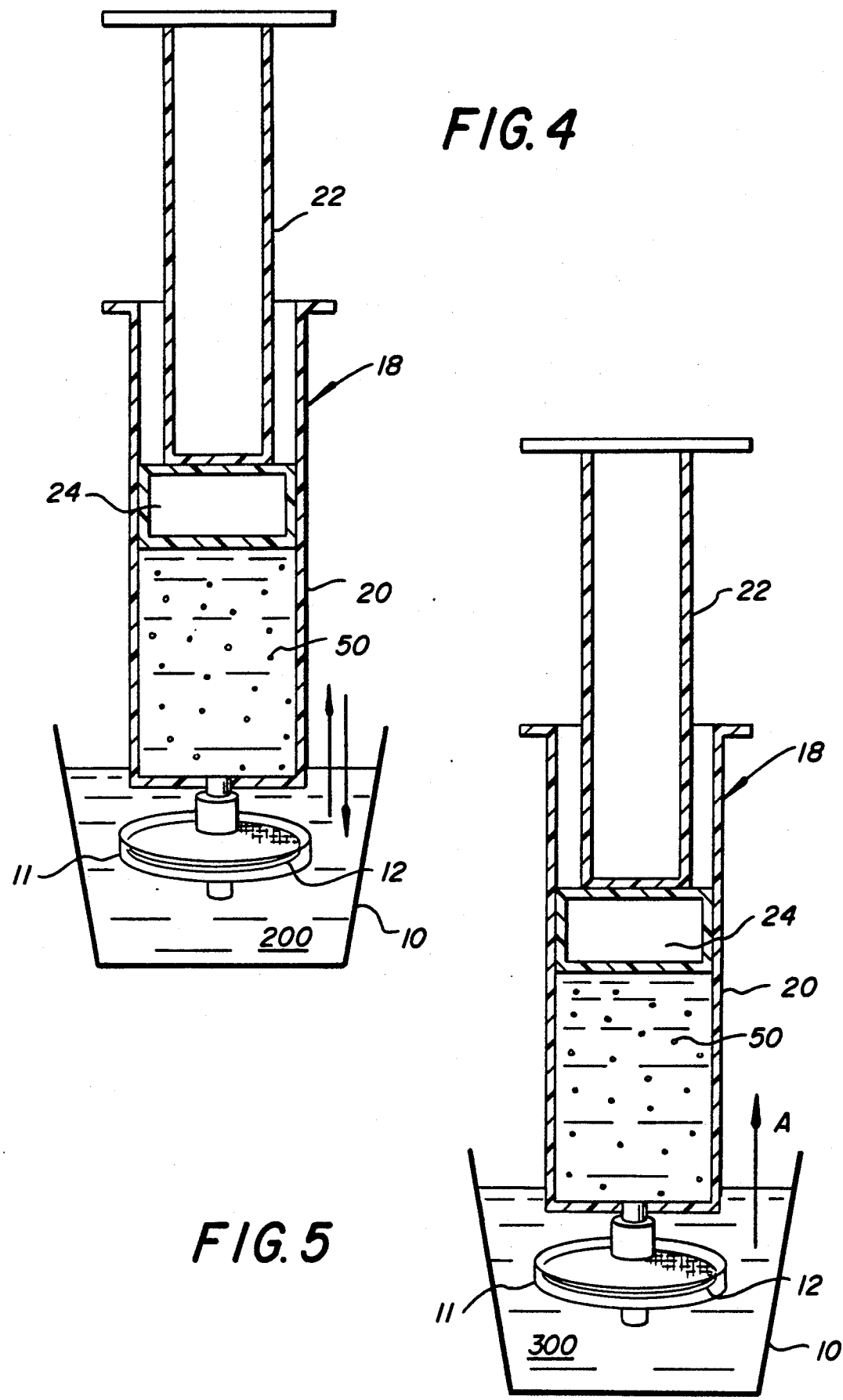

+ + +

+ +

−

+

BARRIER SEAL FOR CONVEYOR SKIRTBOARD

CROSS REFERENCE TO RELATED APPLICATION

This is a continuation-in-part of application Ser. No. 07/226,858 filed Aug. 1, 1988, now abandoned, which is a continuation-in-part of application Ser. No. 07/071,381 filed July 9, 1987, now abandoned.

FIELD OF THE INVENTION

The invention relates to the art of controlling spillage of particulate material in conveyor systems. More particularly, the invention relates to an improved skirtboard seal.

BACKGROUND OF THE INVENTION

Most belt conveyors have a flexible endless belt comprising a load bearing body protected by top and bottom covers of a rubberlike material. The belt is supported at intervals by rollers. The belt is therefore supported against deflection as it curves about each roller, but flexes and sags between the rollers according to the variable load conditions. This flexing and sagging is most severe in the loading zone, because of the impact of the falling particulate material. The quasi-fluid characteristics of the material being loaded causes the material to flow laterally with considerable force upon impact against the belt.

DESCRIPTION OF THE PRIOR ART

In such conveyor belt systems, it is customary to provide stationary lateral skirtboards above the belt along the sides of the loading zone to retain the material on the belt as the material accelerates to the speed of the belt. The skirtboards usually are extensions of the loading chute, with lower edges positioned some distance above the belt on either side of and extending the length of the loading zone.

The gap between the lower edge of each skirtboard is usually sealed by a rubber strip attached to the outer surface of the skirtboard and positioned such that the lower thin edge of the rubber strip engages the belt surface. With this construction it is possible to maintain a seal only if the seal strip is forced down with sufficient pressure to force the belt down to the point of lowest sagging deflection when the belt is loaded. This requires a force approaching that of the impacting material, and therefore exerts considerable pressure between the strip and the belt when the belt runs empty or lightly loaded. This excessive contact pressure leads to formation of grooves on the belt surface, which can cause separation and destruction of the belt. Consequently, frequent adjustment is necessary to compensate for wear of the strip and the belt surface.

In another type of seal, for example as shown in U.S. Pat. No. 4,641,745, a flexible seal strip has an upper edge attached to the outboard side of a metal skirtboard, and has a lower sealing portion deflected inwardly and curled under the skirtboard and engaging the conveyor belt load surface on the inboard side of the skirtboard. In that configuration, the inwardly deflected seal strip defines a longitudinal pocket in which load material accumulates. Such accumulation of load material creates an undesirably high pressure between the lower contacting surface of the seal strip and the upper belt surface which leads to rapid abrasion and wear of the seal strip and the upper belt surface.

Another limitation on the use of the inboard deflected sealing arrangement of U.S. Pat. No. 4,641,745 is that the accumulation of load material within the longitudinal seal strip pocket reduces the flexibility of the seal strip and increases the frictional engagement between the seal strip and the conveyor belt. Moreover, the metal skirtboard is spaced vertically above the belt and seal strip, thereby defining a gap in which rocks or other consolidated load material can become wedged. The wedging of consolidated load material between the stationary skirtboard and the rapidly moving conveyor belt, which may be moving at a high velocity, for example as much as 1,000 feet per minute, may cause catastrophic destruction of the conveyor belt.

In the inboard deflected sealing arrangement of U.S. Pat. No. 4,641,745, a large gap must be maintained between the top surface of the flexible strip and the lower edge of the metal skirtboard to accommodate lateral rippling excursions of the conveyor belt which are produced in response to impact forces of the discharged load material which strike the surface of the conveyor belt at random locations, thereby causing lateral shifting and rippling flexure of the conveyor belt within the loading zone. If the lower edge of the metal skirtboard is positioned closely to the surface of the flexible seal strip to limit the escape of load material into the longitudinal pocket, the seal strip will suffer abrasion damage as the belt shifts laterally. Consequently, the inwardly projecting seal strip will become torn. On the other hand, if the metal skirtboard is spaced far enough away from the flexible strip to avoid abrasion damage, for example a gap distance of two inches, a considerable amount of load material will escape into the longitudinal pocket, thereby increasing frictional engagement. Moreover, consolidated load material such as rocks will become wedged between the lower edge of the metal skirtboard and the flexible strip.

SUMMARY OF THE INVENTION

According to the invention, these and other difficulties of the prior art are avoided by provision of the improved skirtboard seal as described below.

According to one important aspect of the invention, an improved skirtboard seal is provided for a conveyor belt assembly, wherein a conveyor belt moves along an axis between a head pulley and a tail pulley, the belt having an upwardly facing belt surface terminating in a lateral edge. The improved skirtboard seal includes a two-part barrier seal for restricting the escape of particulate material from an inboard working region on the upwardly facing belt surface into an outboard clear region on the upwardly facing belt surface. The two-part barrier seal includes a downwardly extending material retaining wall defining a relatively rigid partition having a first side barrier surface exposed to the inboard working region and an opposite side barrier surface exposed to the outboard clear region, the retaining wall terminating in a lower edge positioned closely above the upwardly facing belt surface to define therewith a small gap bordering the inboard working region, whereby the primary retainer wall confines the bulk of the load material to the inboard working region.

The barrier seal assembly further includes a flexible sheetlike secondary seal having first and second opposite major surfaces, the flexible secondary seal having an upper edge and a lower free edge, the upper edge and the lower free edge extending along the length of the secondary seal and being spaced apart by the width of the secondary seal, the first and the second major surfaces being separated by the thickness of the secondary seal, the thickness being less than either the length or the width. The barrier seal assembly is suspended by a mounting clamp such that its upper edge is spaced by a given distance above the upwardly facing belt surface alongside the opposite surface, the width of the flexible secondary seal being greater than the given distance, the secondary seal in the vicinity of the free edge being deflected away from the inboard working region and toward the outboard clear region by contact between the upwardly facing belt surface and a portion of the second major surface, with the second major portion being spaced from the free edge and resting with light sealing pressure for sliding contact against the upwardly facing belt surface, whereby the flexible secondary seal prevents material leaking through the gap from escaping into the outboard clear region.

According to another aspect of the invention, the second major portion includes a rib projecting from the second major surface of said secondary seal for light contacting engagement against the upwardly facing belt surface on the outboard clear region side of said retaining wall screen.

According to another major aspect of the invention, there is provided a conveyor belt assembly wherein a conveyor belt has an upper surface movable along an axis away from a loading zone, the upper surface having an inboard load support area extending along the axis and an outboard lateral apron extending from the inboard load support area and terminating in a lateral belt edge, and wherein particulate material is dropped onto the inboard load support area in the loading zone and is accelerated to the speed of the belt by contact with the belt, a downwardly extending material retaining wall defining a relatively rigid primary seal having a lower edge positioned above the upper surface of the inboard load support area to define therewith a small gap, the lower edge extending along the length of the loading zone and being located between the axis and the lateral belt edge to thereby separate the inboard working region from the outboard apron, whereby the primary seal confines the bulk of the material to the inboard working zone.

The invention further comprises a flexible sheetlike secondary seal having a length, a width, and a thickness less than either the length of the secondary seal or the width of the secondary seal, the thickness separating first and second opposite major surfaces of the secondary seal, and means suspending the secondary seal above the apron such that the length of the secondary seal extends along and overlies a band along the apron and a sealing portion of one of the major surfaces rests with light sealing pressure in sliding contact with part of the band, the band having a width in the direction normal to the lateral belt edge greater than the thickness of the secondary seal, whereby the secondary seal prevents material leaking through the gap from reaching the lateral belt edge.

According to another aspect of the invention, the secondary seal has an upper edge mounted a given distance above the apron along the length of the loading zone and has an opposite free edge, the distance along the secondary seal between the upper edge and the free edge being greater than the given distance, whereby the secondary seal in the vicinity of the free edge is deflected by contact between the upper belt surface and a sealing portion of the one of the major surfaces.

The function of the primary seal is to absorb the impact and turbulence of the material being loaded onto the conveyor belt. A small volume of material will leak through the primary seal. The function of the flexible secondary seal is to conform with the flexing of the belt edge. This prevents the escape of the material which has leaked through the primary seal. The material trapped by the secondary seal continues on the conveyor belt apron through the tunnel formed between the two seals.

BRIEF DESCRIPTION OF THE DRAWINGS

The present invention will be understood and appreciated by those skilled in the art upon reading the detailed description which follows with reference to the attached drawings, wherein.

DETAILED DESCRIPTION OF THE PREFERRED EMBODIMENT

Figure 1:
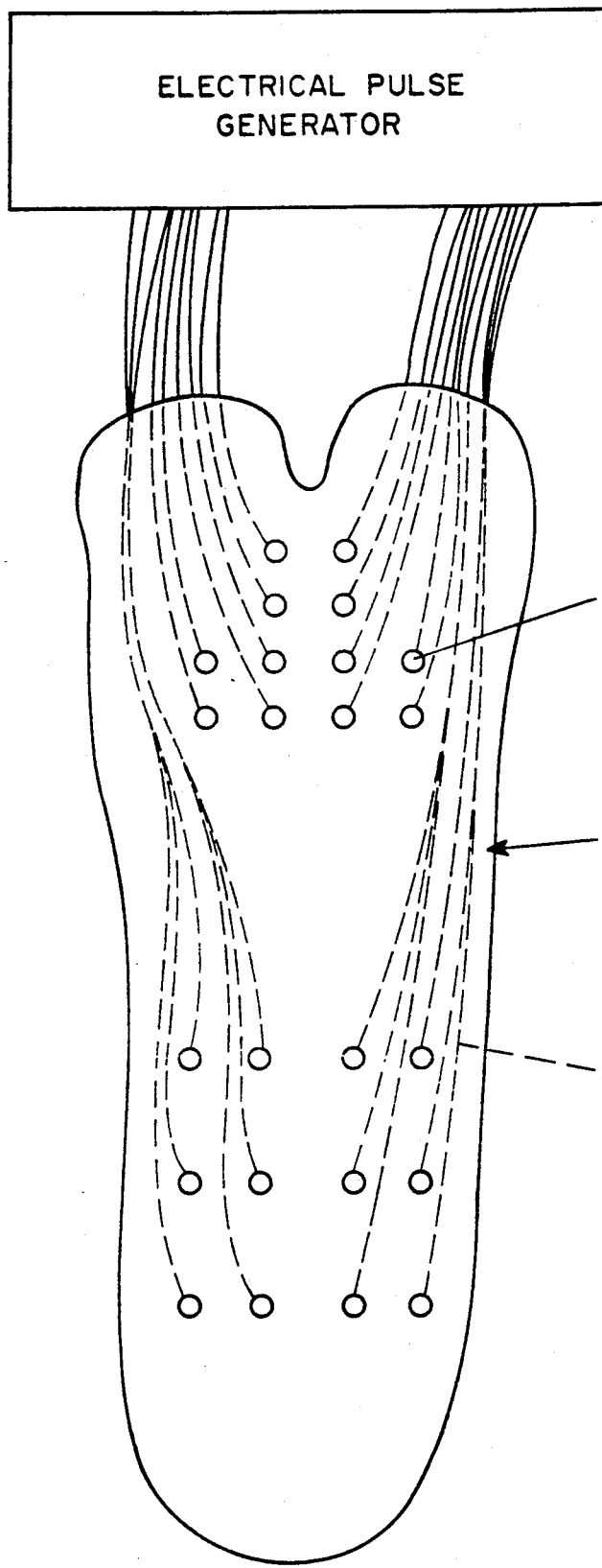
FIG. 1 is a side elevational view of a conveyor system incorporating the present invention.
Figure 2:
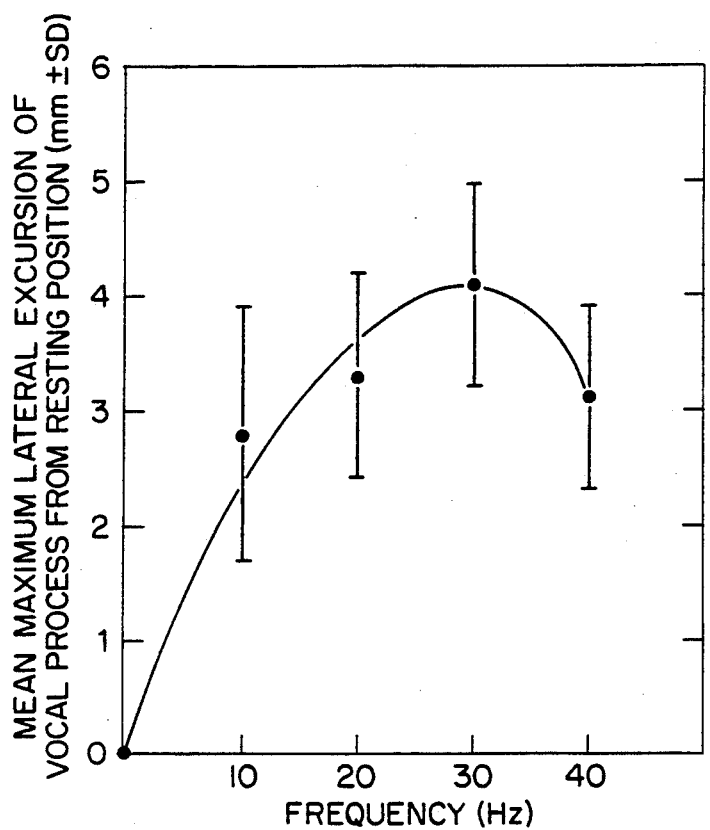
FIG. 2 is a sectional view of the preferred embodiment of the invention, taken along the line 2—2 in FIG. 1, as applied to a troughed conveyor belt.

Referring to FIG. 1 and FIG. 2, the barrier seal assembly 10 of the present invention is incorporated in a conveyor system 20 of the type having a belt 22 moving along its longitudinal axis Q between tail or inlet roll 24 and head or outlet roll 26. Idler rolls 28 between rolls 24 and 26 provide additional support for the belt 22. Particulate material is dropped through a chute 30 onto the upper surface S of belt 22 in a loading zone LZ, and is transported therefrom toward the head roll 26 (to the right as viewed in FIG. 1). Skirtboards 32A, 32B are positioned on laterally opposite sides of the chute 30 above the upper surface S of belt 22 and extend along the length of the loading zone.

The barrier seal assembly 10 includes a primary seal 34 in the form of a barrier wall and a flexible secondary seal 36, together with mounting means as described herein. Each primary seal 34 is mounted by any convenient means along the outboard (away from the axis Q of belt 22) lower edge of its associated skirtboard 32, and comprises a downwardly extending retaining wall 38 having an inside surface 40 exposed to the inboard working region LZ and an external side surface 42 exposed to a clear outboard region 44. The primary seal 34 terminates in a lower edge 46 positioned above the upper surface S of the belt 22 to define therebetween a small gap G.

Figure 7:
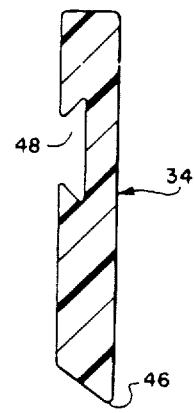

The primary seal 34 (FIG. 7) is formed from a relatively rigid material such as molded nylon polymer, rigid polyurethane, or rigid neoprene elastomer. The durometer of the primary seal material is in the range of 50-90 (Shore "D"), and preferably has a durometer of 80.

Each primary seal 34 accordingly separates the central inboard working region 22C of belt 22 from lateral belt aprons 22A, 22B, each of which extends outwardly from its respective gap G to its respective longitudinal belt edges 22D, 22E. As thus described, the primary seal 34 confines the bulk of the particulate material falling down chute 30 to the central working region 22C of belt 22, with only a small portion of the material leaking through gap G onto the lateral belt aprons 22A, 22B.

According to one method for attaching the secondary seal 36 onto the primary seal 34, the primary seal 34 is provided with a longitudinal mortise cavity 48 which is adapted to receive a dovetail strip 49 which is formed on the secondary seal 36.

While the primary seal 34 is illustrated as a separate element attached to the skirtboard 32, it could be eliminated as a separate element if the skirtboard 32 is positioned close enough to the upper surface of belt 22 to confine the bulk of the falling material to the central working region 22C, in which case the skirtboard 32 would function as the primary seal. However, a separately mounted primary seal 34 is preferred to facilitate adjustment of the gap G.

In accordance with the invention, the flexible, sheet-like secondary seal 36 cooperates with the primary seal 34 to prevent the escape of load material out of the central working region 22C into the clear regions 44. Each seal 36 is formed from a flexible material, having a high resistance to abrasion, preferably either natural or synthetic resins. For example, various known thermoplastic polymer resins such as polyurethane, preferably having a lower resistance to wear than the upper belt surface, and having a durometer of from about 50-70 (Shore "D"), may be used to good advantage. Each flexible seal 36 has an upper attachment end portion 36A mounted a given distance above the upwardly facing surface of belt 22, as by the illustrated dovetail joint 48, 49 to the outboard surface of its associated primary seal 34. The flexible seal 36, like the primary seal 34, has a length dimension extending along the direction of belt travel at least as long as the loading zone LZ. Each seal 36 has a width dimension extending from its upper attachment end portion 36A to the opposite free end portion 36B of seal 36, and a thickness dimension separating respective first and second opposite major seal surfaces 36C and 36D.

Each secondary seal 36 has its length dimension extending along and overlying a band along each conveyor apron 22A, 22B. As illustrated, the band has a width extending laterally from the gap G to the outer free end portion 36B of secondary seal 36. The portion of the apron 22B to the right of free end portion 36B as viewed in FIGS. 2 and 3 forms a part of the clear region 44 where it is desired to prevent particulate material from reaching.

The thickness of secondary seal 36 is less than either the length or the width of the secondary seal, and is less than the width of the band overlain by secondary seal 36. The width of seal 36 is greater than the distance from the upper attachment end portion 36A to the upper surface of belt 22, such that the seal 36 in the vicinity of free end portion 36B is deflected by contact between apron 22B and the lower major surface 36D. Accordingly, a contacting portion of lower major surface 36D spaced from free end portion 36B rests with light sealing pressure in sliding contact with part of the band between gap G and the clear region 44, thus preventing material leaking past the primary seal 36 from entering clear region 44.

The secondary seal 36 in combination with the primary seal 34 defines an elongated tunnel T for confining fine particulate load material which escapes through the gap G, so that the fine particulate load material will be conveyed through the tunnels along the subjacent conveyor belt aprons 22A, 22B beneath the flexible seal 36 on the outboard side of each primary seal 34.

In the exemplary embodiment, the contacting portion is one or more ribs 50 extending along the length of secondary seal 36. The ribs 50 are optional, and provide for increased wear life before the secondary seal 36 must be replaced.

Figure 4:
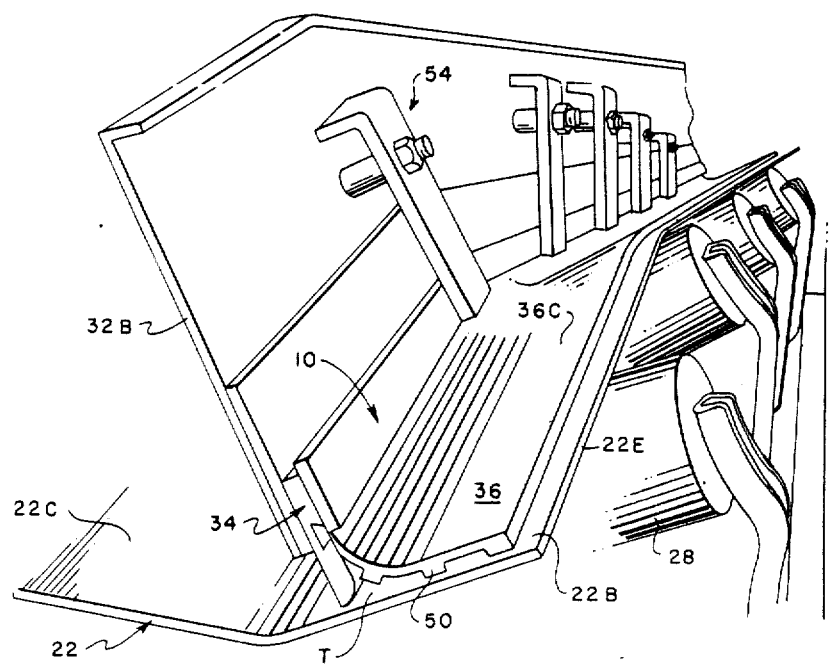
FIG. 4 is a perspective view of a troughed conveyor belt installation, showing adaptation of the preferred embodiment to an angular transition.
Figure 5:
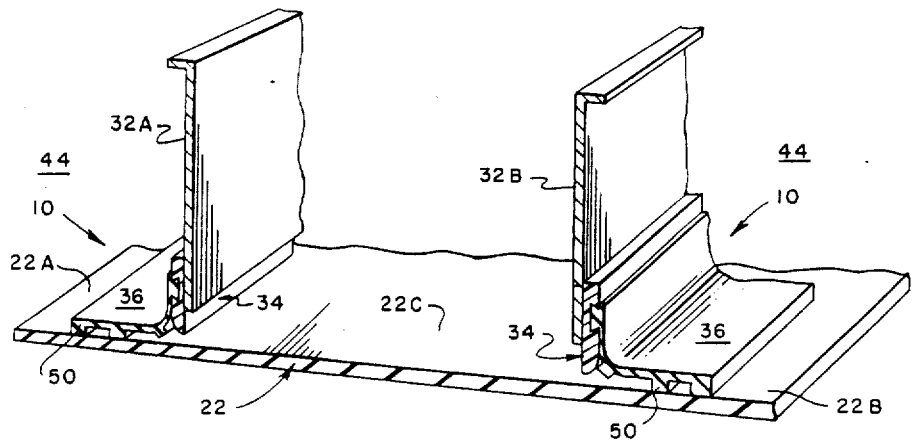
FIG. 5 is a perspective view similar to FIG. 3, showing adaptation of the preferred embodiment to a flat conveyor belt.
Figure 6:
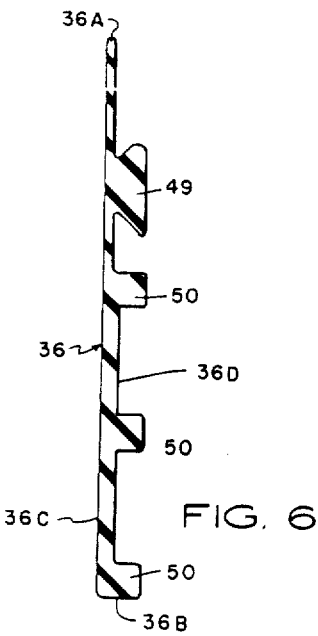

The invention is not limited in applicability to the loading zone, but is useful in other locations such as the angular transition region as illustrated in FIG. 4. The invention may also be used to good advantage in combination with a flat conveyor belt as shown in FIG. 5.

Figure 11:
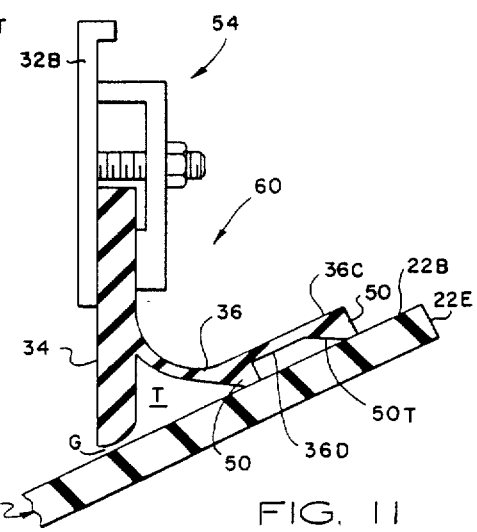
FIG. 11 is a sectional view similar to FIG. 10, illustrating a second alternative embodiment in which the primary and secondary seal members are integrally formed; and, FIG. 12 is a sectional view similar to FIG. 11 which illustrates engagement of the secondary apron seal member against a troughed conveyor belt which is subject to lateral displacement.
Figure 12:
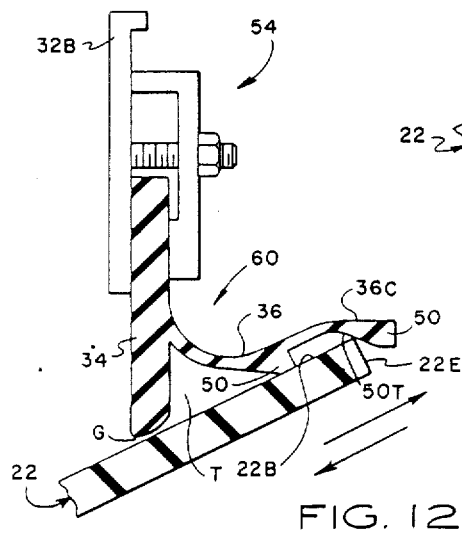

While secondary seal 36 is preferably a separate element mounted on the primary seal 34, it can be integrally formed therewith, as shown in FIGS. 11 and 12.

Figure 3:
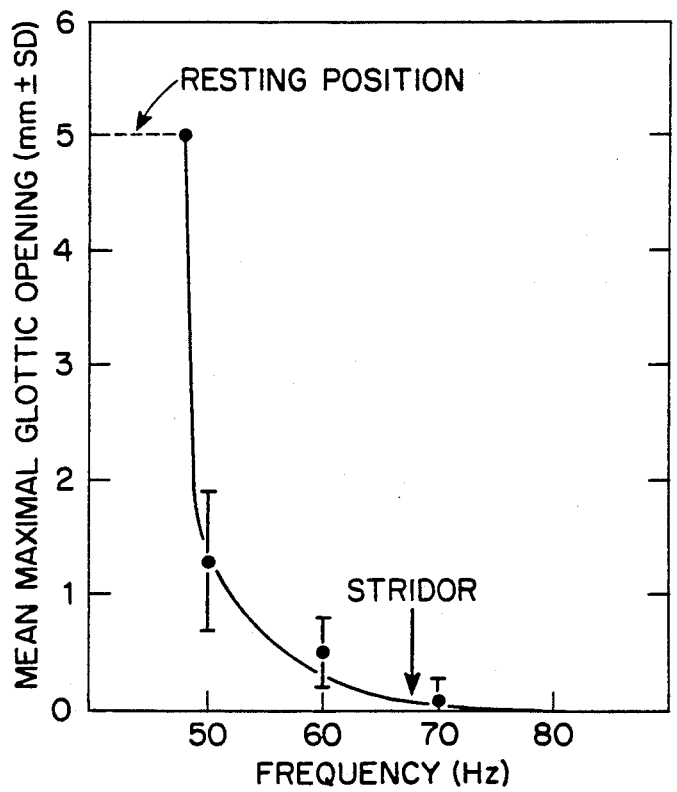
FIG. 3 is a perspective view, partly broken away, of the embodiment shown in FIG. 2.

The barrier seal assembly 10 is preferably clamped onto the skirtboards 32A, 32B by releasable wedge plates 52 as shown in FIG. 3, or by standoff clamp plate 54 as shown in FIG. 4.

Figure 8:
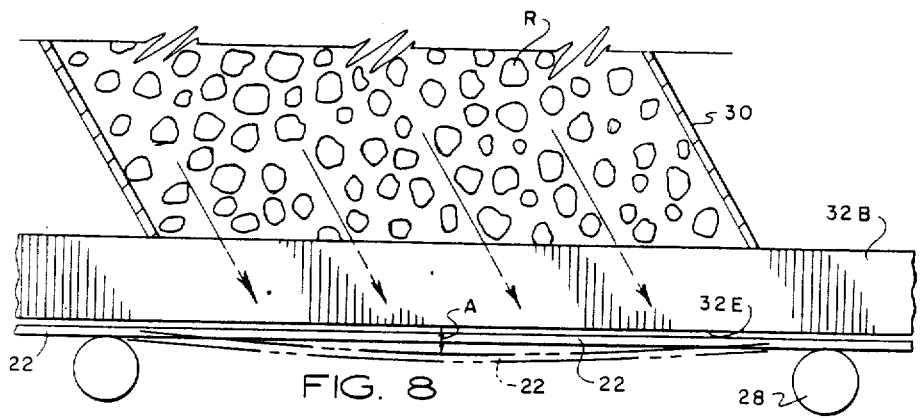
FIG. 8 is a side elevational view, partially broken away, which illustrates deflection of a conveyor belt in response to loading by falling particulate material.
Figure 9:
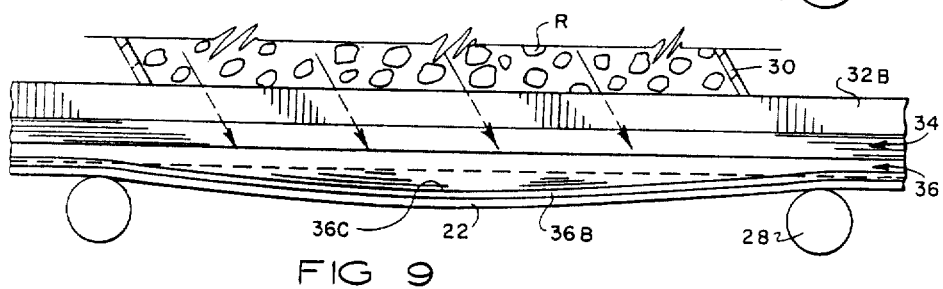
FIG. 9 is a view similar to FIG. 8 in which the gap between the skirtboard and the conveyor belt is continuously sealed by the secondary seal member of the present invention.

Referring now to FIG. 8 and FIG. 9, it should be understood that the conveyor belt 22 is flexible and slightly elastic. The conveyor belt 22 is very often tensioned by a gravity take-up roller which applies tension on the belt. In this situation, the belt 22 is suspended on spaced rollers. Therefore, the conveyor belt can sag between the idler rollers. The sag is normally designed to be limited to about two percent of idler roll spacing. Idler roll spacing is typically three to four feet. In the loading zone as illustrated in FIG. 1, FIG. 8 and FIG. 9, the sag deflection A in the belt as the particulate material R is loaded onto the belt can be as much as $\frac{1}{2}$ to $\frac{3}{4}$ inch or maybe even slightly more. That means that as the material is being loaded, the conveyor belt will open up as much as $\frac{3}{4}$ inch or more between the top surface of the belt and the lower end portion 32E of the skirtboard. Such a large gap A will permit a large quantity of load material to escape out of the loading zone LZ.

As shown in FIG. 9, the primary seal 34 and the secondary seal 36 effectively block the escape of particulate load material R, which may be impacting onto the conveyor belt 22 randomly and with great force. Moreover, the load zone becomes a positive pressure region which tends to cause fine particulate load material to squirt through such small openings as the sag gap A shown in FIG. 8. The escape of bulk, consolidated load material is blocked by the rigid primary seal wall 34 which is positioned closely adjacent to the top of the belt 22, for example by about 1/16 inch. The lower edge 46 of the fixed primary seal 34 is positioned closely enough to the top surface of the belt 22 to avoid contact by flexure movement of the belt, while at the same time preventing the escape or wedging of rocks or other consolidated material.

The small amount of fine particulate load material which does escape through the gap G is trapped beneath the flexible seal 36 and is carried along the belt apron 22A, 22B. While neither the skirtboard 32 nor the primary seal 34 can conform and maintain a seal against the sagging belt 22, the flexible seal member 36 is well adapted to follow and seal against the sagging belt 22. Because of the concave deflected orientation of the flexible sealing members 36, and because of the weight of the seal, a spring bias force is developed which maintains positive engagement of the sealing portions of the flexible seal against the sagging belt. The flexible seal 36 is made of a material which is soft enough to conform to the sagging belt surface, but will not be forced open by the very low volume of fine particulate load material which manages to escape through the gap G beneath the primary seal wall 34. The small amount of fine particulate load material which does escape through the gap will be conveyed along the belt apron beneath the flexible seal 36.

Figure 6:
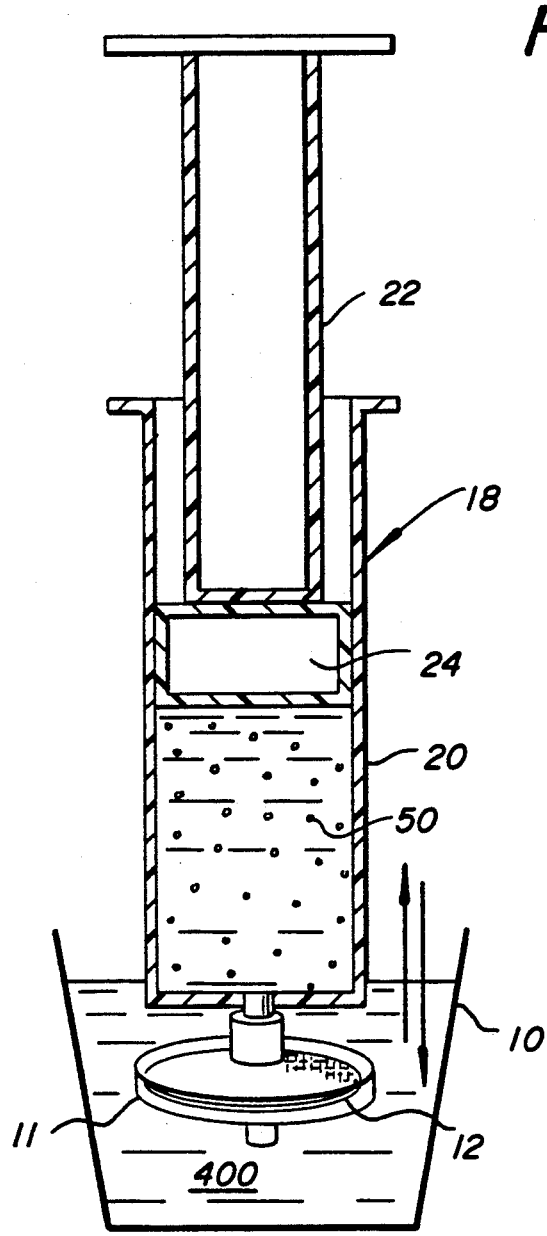
FIG. 6 is a sectional view of a flexible primary seal constructed according to one aspect of the present invention.
Figure 7A:
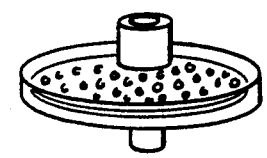
FIG. 7 is a sectional view of a secondary seal which is adapted for attachment to the primary seal shown in FIG. 6.
Figure 7B:
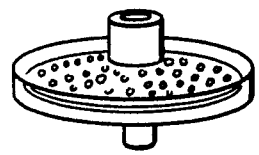
Figure 7D:
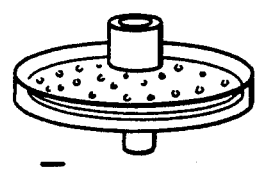
Figure 7C:
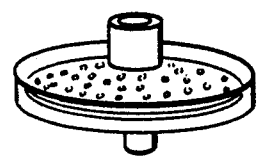
Figure 1:
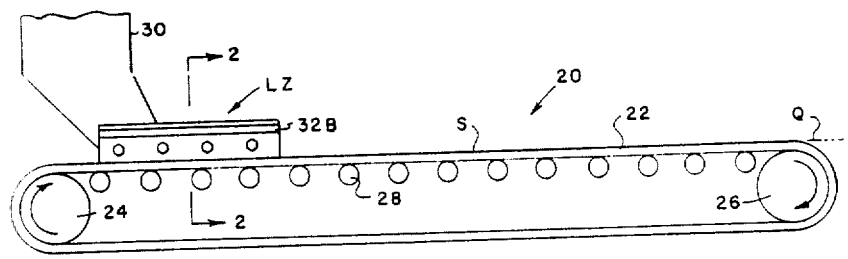
Figure 2:
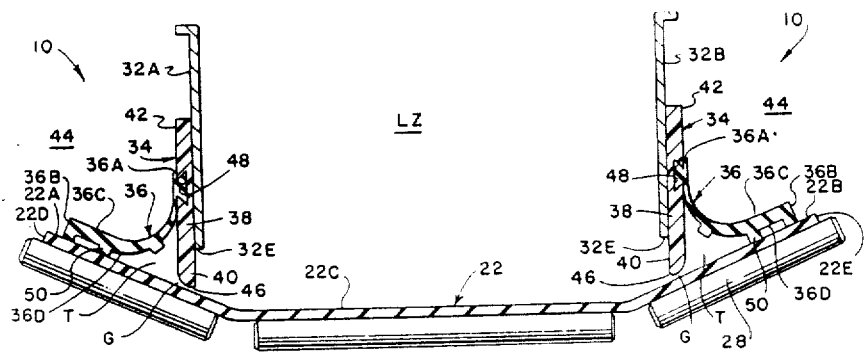
Figure 3:
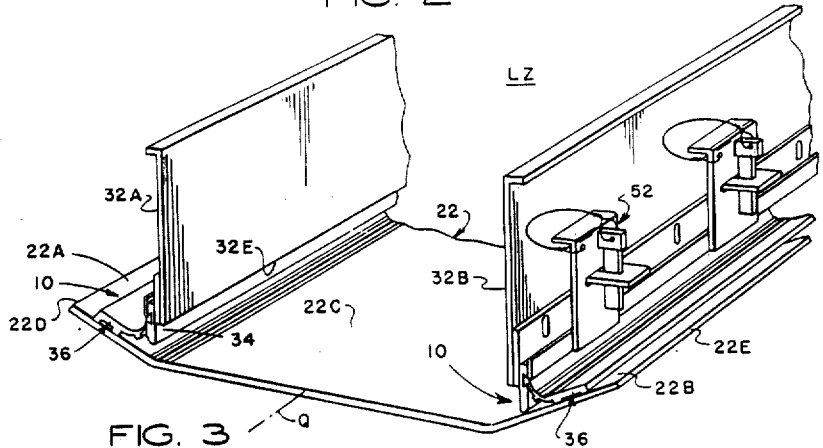

Referring again to FIG. 2 and FIG. 6, the flexibility of the seal member 36 is increased by the reduced thickness of the member near its upper attachment end 36A as compared with the thickness of the lower end 36B. Preferably, the thickness of the seal member 36 increases linearly from the upper attachment end 36A to the lower free end 36B. The spring tension applied by the flexible seal member 36 is reduced slightly by reducing its thickness along its upper end. The ribs 50 are formed on the flexible seal member 36 to reduce the area of frictional engagement, thereby extending the life of the flexible seal 36.

Figure 10:
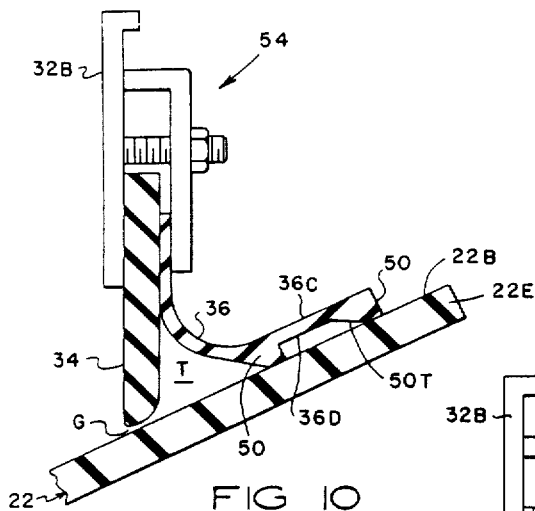
FIG. 10 is a sectional view, partially broken away, which illustrates a first alternative assembly of primary and secondary seals in combination with a troughed conveyor belt.

The dovetail interlock shown in FIG. 2, FIG. 3, FIG. 6 and FIG. 7 facilitates installation of the barrier seal assembly 10, particularly while adjusting the gap clearance G. The primary and secondary seals 34, 36 may be integrally formed together, as shown in the barrier seal assembly 60 of FIG. 11 and FIG. 12. However, the primary and secondary seals may be completely separate and clamped together as shown in FIG. 10.

Referring now to FIG. 12, the belt 22 tends to wander laterally on the rollers 28 in response to the impact forces applied by the falling load material. That is, the belt does not always run perfectly true and in alignment with the idler rollers 28. Excessive loading on one side of the trough causes the belt to tend to run in the direction of the uneven loading. As the uneven loading is reduced, the belt tends to return to its centered position. As this lateral shifting occurs as indicated by the arrows in FIG. 12, the belt is shifted laterally (left arrow) until the flexible seal 36 and rib 50 extend over the belt edge 22E. To avoid damage to the flexible seal 36 as a result of such lateral belt shifting, the ribs 50 have a tapered inside surface 50T which will permit the belt edge 22E to ride in and out without snagging, binding or cutting the flexible secondary seal 36.

Although the invention has been described with reference to preferred and alternative embodiments, and with reference to preferred materials, the foregoing description is not intended to be construed in a limiting sense. Various modifications of the disclosed embodiments as well as alternative applications of the invention will be suggested to persons skilled in the art by the foregoing specification and illustrations. It is therefore contemplated that the appended claims will cover an such modifications, applications or embodiments as fall within the true scope of the invention.

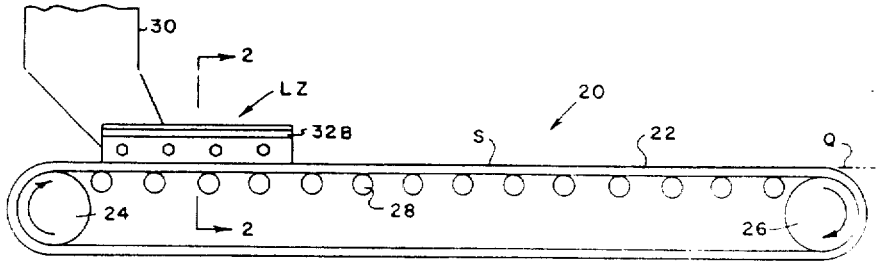

What is claimed is:

1. In a conveyor belt installation wherein a conveyor belt is movable along an axis between a head pulley and a tail pulley, said belt having an upwardly facing belt surface terminating in a lateral edge, a barrier seal assembly for preventing particulate material in a working region on said upwardly facing belt surface from entering a clear region on said upwardly facing belt surface, said barrier seal assembly comprising, in combination:

a downwardly extending material retaining wall defining a relatively rigid primary seal having a first side surface exposed to said working region and an opposite side surface exposed to said clear region, said retaining wall terminating in a lower edge positioned above said upwardly facing belt surface to define therebetween a small gap bordering said working region, whereby said primary seal confines the bulk of said particulate material to said working region;

a flexible sheetlike secondary seal having first and second opposite major side surfaces, said secondary seal having an upper attachment end portion and a lower free end portion, said upper attachment end portion and a lower free end portion extending along the length of said secondary seal and being spaced apart by the width of said secondary seal, said first and said second major side surfaces being separated by the thickness of said secondary seal, said thickness being less than either said length or said width; and, mounting apparatus suspending said upper attachment end portion adjacent to and in contact with said retaining wall a given distance above said upwardly facing belt surface, said secondary seal forming a flexible web which extends angularly outwardly from said upper attachment end portion adjacent said retaining wall to said lower free end portion spaced outwardly from said retaining wall, said secondary seal being deflected away from said working region and toward said clear region by contact between said upwardly facing belt surface and a sealing portion of said second major side surface, said sealing portion resting with light sealing pressure against the upwardly facing belt surface lying between said gap and the lateral edge of said belt, whereby said secondary seal prevents particulate material leaking through said gap from entering said clear region.

2. A conveyor belt installation as defined in claim 1, wherein said sealing portion comprises a rib projecting from said second major surface.

3. A conveyor belt installation as defined in claim 2, wherein said rib has an inside surface which is tapered with respect to said second major surface.

4. A conveyor belt installation as defined in claim 1, wherein said primary seal and said secondary seal in combination with the upwardly facing belt surface defines a longitudinal tunnel for accumulating particulate material which leaks through said gap.

5. A conveyor belt installation as defined in claim 1, wherein said primary seal and said secondary seal are integrally formed together.

6. A conveyor belt installation as defined in claim 1, wherein said primary seal has a mortise cavity extending along its length, and wherein said secondary seal has a dovetail joint extending along its length, said dovetail joint being received in interlocking engagement within said mortise cavity.

7. A conveyor belt installation as defined in claim 1, wherein said mounting apparatus comprises a skirtboard.

8. A conveyor belt installation as defined in claim 7, said mounting apparatus including a wedge plate coupling said barrier seal assembly onto said skirtboard.

9. A conveyor belt installation as defined in claim 7, said mounting apparatus including a clamp plate coupling said barrier seal assembly onto said skirtboard.

10. A conveyor belt installation as defined in claim 1, wherein the thickness of the secondary seal between the first and second major side surfaces on the attachment end of said secondary seal being less than the thickness of said secondary seal between the first and second major side surfaces on the lower free edge thereof.

11. A conveyor belt installation as defined in claim 1, wherein said secondary seal is characterized by a thickness which increases linearly from said upper attachment end to said lower free end.

12. In a conveyor belt assembly wherein a conveyor belt has an upper surface movable along an axis away from a loading zone, said upper surface having a central working region extending along said axis and an apron extending laterally from said working region and terminating in a longitudinal belt edge, and wherein particulate material is dropped onto said working region in said loading zone and is accelerated to the speed of said belt by engagement with said belt, the improvement comprising:

a downwardly extending material retaining wall defining a relatively rigid primary seal having a lower edge positioned above said conveyor belt upper surface to define therebetween a small gap, said lower edge being located between said axis and said belt edge to thereby separate said working region from said apron, whereby said primary seal confines the bulk of said material to said working zone;

a flexible sheetlike secondary seal having a thickness less than either the length of said secondary seal or the width of said secondary seal, said width separating an upper attachment end portion and a lower free end portion, said thickness separating first and second opposite major side surfaces of said secondary seal;

apparatus suspending said secondary seal adjacent to and in contact with said retaining wall above said apron, said secondary seal forming a flexible web which extends angularly outwardly from said upper attachment end portion adjacent said retaining wall to said lower free end portion spaced outwardly from said retaining wall such that the length of said secondary seal extends along and overlies a band along said apron and a flexible sealing portion of one of said major side surfaces rests with light sealing pressure in slidable contact with part of said band; and, said band having a width in the direction normal to said belt edge greater than said thickness, whereby said secondary seal prevents material leaking through said gap from reaching said longitudinal belt edge.

13. The conveyor belt assembly as defined in claim 12, wherein said secondary seal has an upper attachment edge portion mounted a given distance above said apron along the length of said loading zone and has an opposite free edge portion, the distance along said secondary seal between said upper attachment edge portion and said lower free edge being greater than said given distance, whereby said secondary seal in the vicinity of said free edge portion is deflected by contact between said apron and said sealing portion of said one of said major side surfaces.

14. The assembly as defined in claim 12, wherein said sealing portion of said one of said major surfaces comprises a raised rib disposed in contact with said band.

15. The assembly as defined in claim 14, wherein said rib extends generally parallel t said longitudinal belt edge.

16. The assembly as defined in claim 12, wherein said upper attachment edge portion of said secondary seal is mounted on said primary seal.

17. The assembly as defined in claim 12, including a skirtboard extending along the length of said loading zone, and said primary seal is a separate element mounted onto said skirtboard.

18. The assembly as defined in claim 12, wherein said secondary seal has an upper attachment end portion mounted above said apron along the length of said loading zone and has an opposite free end portion, the thickness of the secondary seal between the first and second major side surfaces on the attachment end portion of said secondary seal being less than the thickness of said secondary seal between the first and second major side surfaces on the lower free end portion thereof.

19. The assembly as defined in claim 12, wherein said secondary seal has an upper attachment end portion mounted above said apron along the length of said loading zone and has an opposite free end portion, said secondary seal being characterized by a thickness which increases linearly from said upper attachment end portion to said lower free end portion.

20. A barrier seal assembly for use in combination with a skirtboard in a conveyor belt installation comprising, in combination:

an elongated retainer wall defining a relatively rigid primary seal having an upper end portion adapted for suspended attachment to a skirtboard and having a lower end portion adapted for placement above the load bearing surface of a subjacent conveyor belt, thereby defining an elongated gap therebetween; and, an elongated, flexible, sheetlike secondary seal having a length substantially co-extensive with the length of said primary seal and having a first end portion suspended adjacent to and in contact with said retainer wall, and having a second flexible sealing end portion adapted for surface engagement against the outboard apron of the subjacent conveyor belt, with said flexible sealing end portion being deflected by its engagement against the outboard apron of a subjacent conveyor belt and laterally spaced with respect to said retainer wall when said retainer wall is positioned above a subjacent conveyor belt, said secondary seal forming a flexible web which extends angularly outwardly from said first end portion adjacent said retainer wall to said second sealing end portion spaced outwardly from said retainer wall;

whereby said primary seal provides a relatively rigid barrier for containing load material on an inboard side of the subjacent conveyor belt, and the secondary seal in combination with the primary seal defines an elongated tunnel for confining fine particulate load material which escapes through the gap, so that said fine particulate load material will be conveyed through said tunnel along the subjacent conveyor belt apron beneath the flexible secondary seal on the outboard side of said primary seal.

21. A barrier seal assembly as defined in claim 20, wherein said secondary flexible seal is integrally formed with said primary seal.

22. A barrier seal assembly as defined in claim 20, wherein said secondary flexible seal comprises a raised rib adapted for contact with the apron of a subjacent conveyor belt.

23. A barrier seal assembly as defined in claim 20, wherein said primary seal and said secondary seal each have marginal end portions which are adapted to be clamped together for mounting onto a skirtboard.

24. A barrier seal assembly as defined in claim 20, wherein said primary seal has a mortise cavity extending along its length, and wherein said secondary seal has a dovetail joint extending along its length, said dovetail joint being received in interlocking engagement with said mortise cavity.

25. A method for controlling spillage of particulate material in a conveyor system of the type having a skirtboard disposed along a subjacent conveyor belt in a loading zone comprising the steps:

suspending a primary seal from said skirtboard with its lower edge spaced above the load bearing surface of the subjacent conveyor belt, thereby defining an elongated gap therebetween;

reacting the impact force of particulate material being loaded onto the conveyor belt against the inboard side of said primary seal;

suspending a flexible secondary seal from said primary seal adjacent to and in contact with said primary seal such that said secondary seal forms a flexible web which extends angularly outwardly from a first end portion adjacent said primary seal to a second sealing end portion spaced outwardly from said primary seal and engaging said second sealing end portion of said flexible secondary seal against the outboard apron surface of said conveyor belt, thereby defining a longitudinal tunnel on the outboard side of said primary seal for accumulating fine particulate load material which escapes through the gap between the primary seal and the conveyor belt; and, conveying accumulated particulate material through the longitudinal tunnel.

* * * * *

UNITED STATES PATENT AND TRADEMARK OFFICE
CERTIFICATE OF CORRECTION

PATENT NO. : 5,016,747                            Page 1 of 6

DATED     : May 21, 1991

INVENTOR(S) : Willem D. Veenhof

It is certified that error appears in the above-identified patent and that said Letters Patent is hereby corrected as shown below:

On the title page, delete the figure which is shown.
On drawing sheet 1 of 4, delete the figure shown in Fig. 1.
On drawing sheet 2 of 4, delete the figures shown in Fig. 2 and Fig. 3.
On drawing sheet 3 of 4, delete the figures shown in Fig. 4 and Fig. 5.
On drawing sheet 4 of 4, delete the figures shown in Fig. 6, Fig. 7a, Fig. 7b, Fig. 7c and Fig. 7d.
Insert the title page showing the illustrative figure as per attached sheet.
Insert Fig. 1, Fig. 2 and Fig. 3 as shown on the attached drawing sheet 1 of 4.
Insert Fig. 4 and Fig. 5 as shown on the attached drawing sheet 2 of 4.
Insert Fig. 6, Fig. 7, Fig. 8 and Fig. 9 as shown on the attached drawing sheet 3 of 4.
Insert Fig. 10, Fig. 11 and Fig. 12 as shown on the attached drawing sheet 4 of 4.

Signed and Sealed this

Twenty-sixth Day of November, 1991

*Attest:*

HARRY F. MANBECK, JR.

*Attesting Officer*          *Commissioner of Patents and Trademarks*

United States Patent [19]

Veenhof

[11] Patent Number: 5,016,747
[45] Date of Patent: May 21, 1991

[54] BARRIER SEAL FOR CONVEYOR SKIRTBOARD

[75] Inventor: Willem D. Veenhof, El Cajon, Calif.

[73] Assignee: Martin Engineering Company, Neponset, Ill.

[21] Appl. No.: 541,628

[22] Filed: Jun. 21, 1990

Related U.S. Application Data

[63] Continuation-in-part of Ser. No. 226,858, Aug. 1, 1988, abandoned, which is a continuation-in-part of Ser. No. 71,381, Jul. 9, 1987, abandoned.

[51] Int. Cl.$^5$ .............................................. B65G 47/44
[52] U.S. Cl. .................................. 198/525; 198/836.1; 198/836.3; 198/860.3
[58] Field of Search ................ 198/525, 547, 550.13, 198/836.1, 836.3, 836.4, 860.3

[56] References Cited

U.S. PATENT DOCUMENTS

| | | | |
|---|---|---|---|
| 2,584,288 | 2/1952 | Przyrylski | 198/836.3 X |
| 2,593,610 | 4/1952 | Roberts | 198/836.1 X |
| 2,665,795 | 1/1954 | Holwick | 198/836.1 |
| 2,883,035 | 4/1959 | Erisman | 198/547 X |
| 2,988,202 | 6/1961 | Pampel et al. | 198/836.3 X |
| 3,024,893 | 3/1962 | Lambert | 198/836.1 |
| 3,253,305 | 5/1966 | Granath | 198/525 X |
| 3,399,466 | 9/1968 | Hartley | 198/550.13 X |
| 3,499,523 | 3/1970 | Clegg | 198/836.1 |
| 3,707,222 | 12/1972 | Hartley | 198/547 X |
| 4,204,595 | 5/1980 | Marrs | 198/836.1 |
| 4,231,471 | 11/1980 | Gordon | 198/836.1 |
| 4,236,628 | 12/1980 | Stahura | 198/525 |
| 4,641,745 | 2/1987 | Skates | 198/860.3 X |
| 4,667,810 | 5/1987 | Cowpertwait et al. | 198/836.1 X |

Primary Examiner—D. Glenn Dayoan
Attorney, Agent, or Firm—Dennis T. Griggs

[57] ABSTRACT

In a conveyor belt assembly for conveying particulate material, a rigid primary seal is mounted between the inboard loading zone and an outboard region of the belt which is desired to remain clear of particulate material. A flexible secondary seal is mounted between the primary seal and the outboard region, and includes a flexible sheetlike member having a sealing portion resting with light sealing pressure in sliding contact with the upper belt surface.

25 Claims, 4 Drawing Sheets